(12) United States Patent
Denneman et al.

(10) Patent No.: US 11,461,191 B2
(45) Date of Patent: Oct. 4, 2022

(54) ORCHESTRATING AND PRIORITIZING THE REBUILD OF STORAGE OBJECT COMPONENTS IN A HYPER-CONVERGED INFRASTRUCTURE

(71) Applicant: VMware, Inc., Palo Alto, CA (US)

(72) Inventors: Frank Denneman, Purmerend (NL); Duncan Epping, Helmond (NL); Cormac Hogan, Cork (IE)

(73) Assignee: VMware, Inc., Palo Alto, CA (US)

( * ) Notice: Subject to any disclaimer, the term of this patent is extended or adjusted under 35 U.S.C. 154(b) by 396 days.

(21) Appl. No.: 16/684,413

(22) Filed: Nov. 14, 2019

(65) Prior Publication Data
US 2021/0149774 A1    May 20, 2021

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 2009/45583* (2013.01); *G06F 2201/815* (2013.01); *G06F 2201/82* (2013.01)

(58) Field of Classification Search
CPC .. G06F 11/14; G06F 11/1469; G06F 11/2094; G06F 11/2023; G06F 2201/82
See application file for complete search history.

(56) References Cited

U.S. PATENT DOCUMENTS

| | | | | |
|---|---|---|---|---|
| 7,933,987 | B2* | 4/2011 | Aidun | G06F 11/2025 709/224 |
| 8,549,364 | B2* | 10/2013 | Ziskind | G06F 11/0709 714/48 |
| 10,778,520 | B2* | 9/2020 | Patel | H04L 41/0893 |
| 2010/0211829 | A1* | 8/2010 | Ziskind | G06F 11/0757 714/48 |
| 2014/0059380 | A1* | 2/2014 | Krishnan | G06F 11/1484 714/15 |
| 2015/0058298 | A1* | 2/2015 | Earl | G06F 16/13 707/674 |
| 2017/0364287 | A1* | 12/2017 | Antony | G06F 11/0757 |
| 2017/0364422 | A1* | 12/2017 | Antony | G06F 11/079 |
| 2019/0095232 | A1* | 3/2019 | Okuno | G06F 9/45558 |
| 2020/0117494 | A1* | 4/2020 | Cortez | G06F 9/5088 |
| 2021/0157695 | A1* | 5/2021 | Tai | G06F 11/2094 |
| 2021/0216345 | A1* | 7/2021 | Natu | G06F 3/0647 |

\* cited by examiner

Primary Examiner — Kamini B Patel

(57) ABSTRACT

Techniques for orchestrating and prioritizing the rebuild of storage object components in a hyper-converged infrastructure (HCI) deployment comprising a cluster of host systems are provided. In one set of embodiments, a computer system can identify a list of storage object components impacted by a maintenance event or failure of a host system in the cluster. The computer system can further determine a priority class for each storage object component in the list, where the determined priority class is based on a virtual machine (VM)-level priority class assigned to a VM to which the storage object component belongs. The computer system can then initiate rebuilds of the storage object components in the list on a per-VM and per-priority class basis, such that: (1) the rebuilds of storage object components belonging to the same VM are initiated consecutively, and (2) the rebuilds of storage object components with higher priority classes are initiated before the rebuilds of storage object components with lower priority classes.

18 Claims, 5 Drawing Sheets

ORCHESTRATING AND PRIORITIZING THE REBUILD OF STORAGE OBJECT COMPONENTS IN A HYPER-CONVERGED INFRASTRUCTURE

BACKGROUND

In a hyper-converged infrastructure (HCI) deployment comprising a cluster of host systems, persistent data associated with the cluster's virtual machines (VMs) is maintained in the form of storage objects and each storage object is composed of one or more components that are distributed across the local storage resources of the host systems. When a host system of the cluster fails or is taken offline for maintenance, the storage object components stored on that failed/offline host system (referred to herein as "inaccessible" components) are rebuilt on other available host systems in the cluster. This ensures that the VMs to which the inaccessible components belong can remain in compliance with VM-level storage policies dictating certain levels of fault tolerance for the VMs' storage objects (e.g., RAID-1, RAID-5, or RAID-6). However, with existing HCI implementations, the order in which inaccessible components are rebuilt is random. Thus, it is possible that the storage object components of less important VMs are rebuilt first while the storage object components of more important VMs (e.g., those running business-critical or revenue-generating workloads) remain waiting to be rebuilt for a significant amount of time. During this timeframe, those more important VMs will be vulnerable to further failures within the cluster that can lead to a service outage and/or permanent data loss.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for orchestrating and prioritizing the rebuild of storage object components in an HCI deployment on a per-VM basis. In one set of embodiments, these techniques include assigning a priority class to each VM provisioned within the deployment's host cluster, where the priority class indicates the priority at which the VM's storage object components should be rebuilt. In a particular embodiment, these priority classes may be specified by a cluster administrator or other user in a policy-based manner via the VMs' respective storage policies.

Then, at the time of a host failure or maintenance event in the cluster, the cluster's HCI storage management layer can (1) identify the storage object components impacted by the failure or maintenance event (and thus, the components in need of rebuild), (2) group the identified components based on the VMs to which they belong, (3) sort the component groups in accordance with their respective VMs' priority classes, and (4) rebuild the components in the order determined at step (3), from the highest priority class to the lowest priority class. With this approach, all of the storage object components of higher priority VMs will be rebuilt before the storage object components of lower priority VMs, per the priority class assignments. This allows the higher priority VMs (which may be, for example, business-critical or revenue-generating VMs) to re-attain compliance with their storage policies as quickly as possible after the failure/maintenance event, which in turn reduces the risk that those VMs will be rendered inaccessible or lose data if additional failures arise in the cluster.

2. Example HCI Deployment

Figure 1:
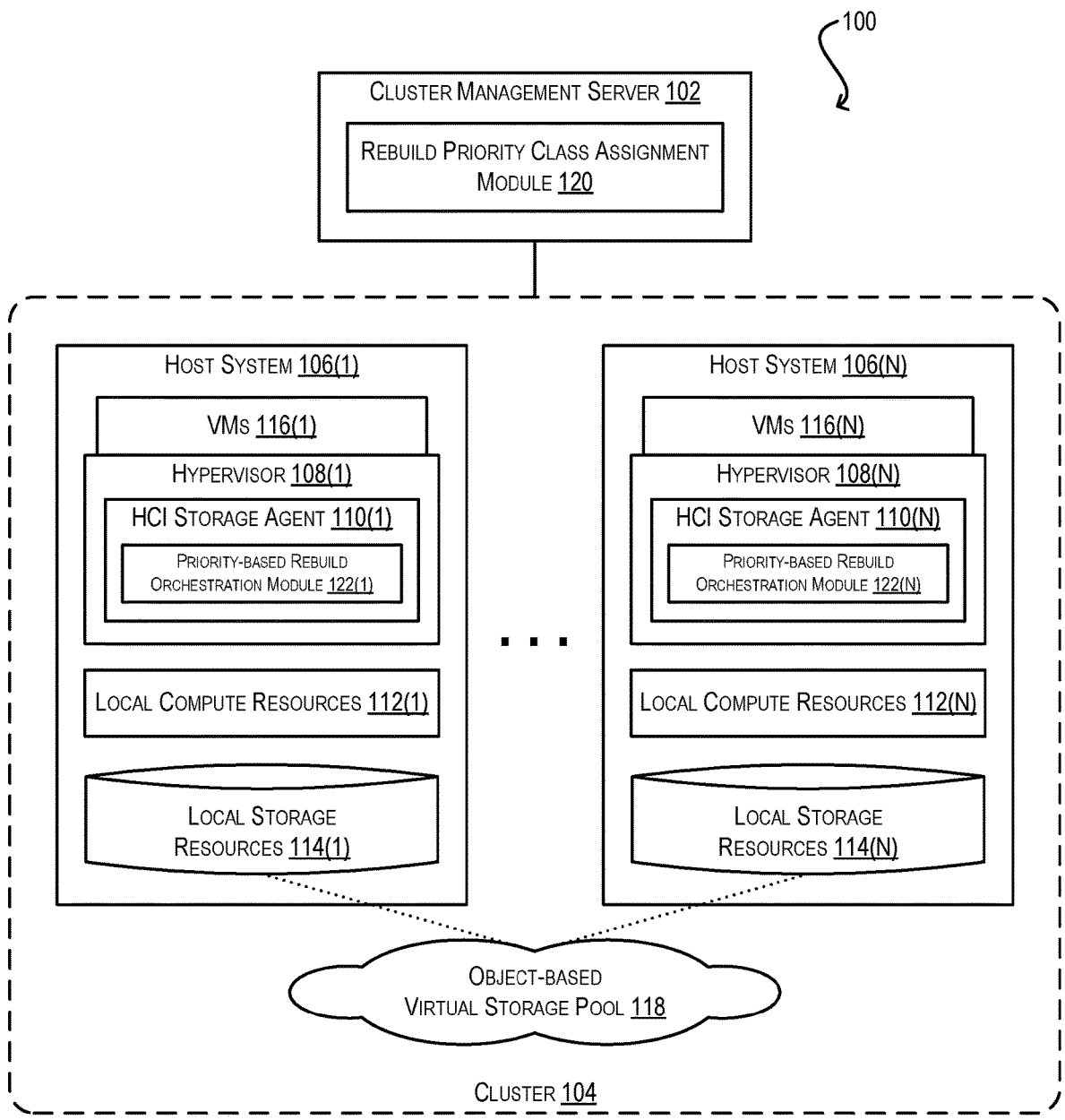
FIG. 1 depicts an example HCI deployment according to certain embodiments.

FIG. 1 is a simplified block diagram of an HCI deployment 100 that implements the techniques of the present disclosure according to certain embodiments. As shown, HCI deployment 100 includes a cluster management server 102 that is communicatively coupled with a cluster 104 of host systems 106(1)-(N). Each host system 106 comprises a hypervisor 108 with an HCI storage agent 110, a set of local compute resources 112 (e.g., central processing units (CPUs)), and a set of local storage resources 114 (e.g., directly-attached solid state disks, magnetic disks, non-volatile memory (NVM), etc.).

Hypervisors 108(1)-(N) are configured to virtualize the local compute resources of host systems 106(1)-(N) and allocate the virtualized compute resources to one or more locally running virtual machines (VMs) 116(1)-(N). Each VM, in turn, is configured to utilize the compute resources provided by its respective hypervisor to execute computing workloads (e.g., guest applications) via a guest operating system (OS) layer.

HCI storage agents 110(1)-(N) residing within hypervisors 108(1)-(N) are configured to aggregate local storage resources 114(1)-(N) of host systems 106(1)-(N) into an object-based virtual storage pool 118 and make virtual storage pool 118 available to VMs 116(1)-(N) for data storage purposes. In this way, the persistent data used by VMs 116(1)-(N) can be maintained directly on host systems 106(1)-(N) rather than on separate, dedicated storage servers/arrays.

The "object-based" qualifier for virtual storage pool 118 indicates that HCI storage agents 110(1)-(N) manage VM data in pool 118 in the form of storage objects. Each storage object is a logical data volume/container composed of one or more components, and each component can be understood as a sub-object that contains some portion of the data and/or metadata of the storage object. These components are distributed across the local storage resources of host systems 106(1)-(N) which form the physical storage layer of pool 118. Generally speaking, the manner in which the storage objects belonging to a VM (e.g., virtual disk (VMDK) objects, namespace object, swap objects, etc.) are split into components and are laid out across the local storage resources of host systems 106(1)-(N) will depend on fault tolerance parameter(s) that are specified in a storage policy associated with that VM. By way of example, the following table lists four possible ways in which a VM's storage object may be laid out in accordance with a "Failures to Tolerate" (FTT) storage policy parameter that is supported by VMware's vSAN HCI platform:

TABLE 1

| FTT Parameter Value | Parameter Value Meaning | Resulting Storage Object Layout |
|---|---|---|
| 0 | Storage object protection disabled | Single component residing on single host system |
| 1 | Storage object protection enabled via RAID-1 mirroring (available for 3 or more host systems) or RAID-5 parity striping (available for 4 or more host systems) | At least 2 components residing on at least 2 host systems (in the case of RAID-1) or at least 3 components residing on at least 3 host systems (in the case of RAID-5) |
| 2 | Storage object protection enabled via RAID-1 mirroring (available for 5 or more host systems) or RAID-6 parity striping (available for 6 or more host systems) | At least 3 components residing on at least 3 host systems (in the case of RAID-1) or at least 4 components residing on at least 4 host systems (in the case of RAID-6) |
| 3 | Storage object protection enabled via RAID-1 mirroring (available for 7 or more host systems) | At least 4 components residing on at least 4 host systems |

Figure 2:
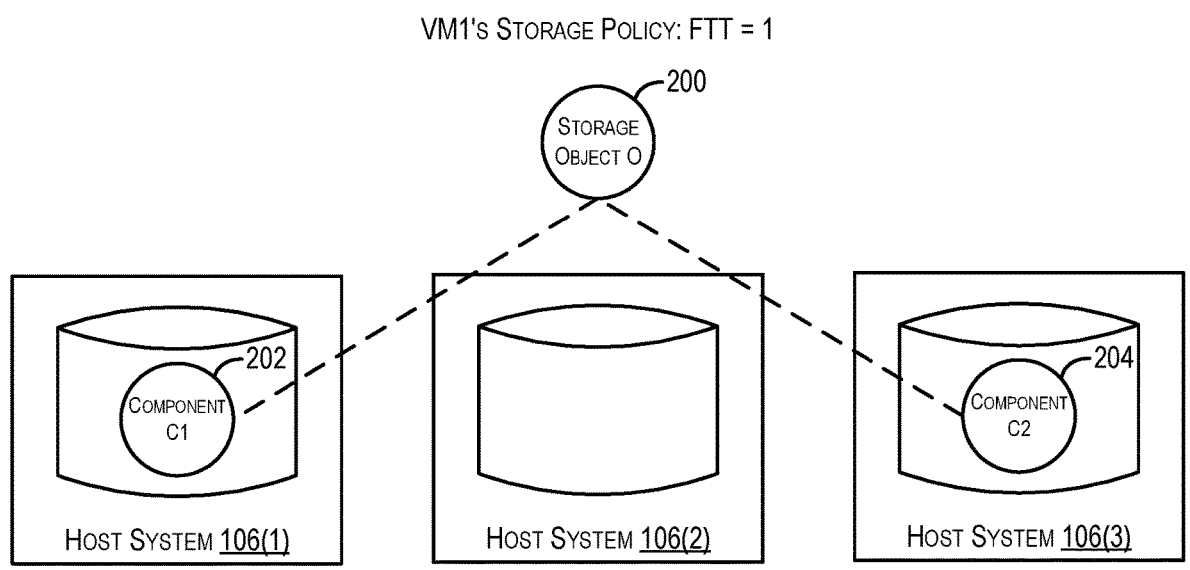
FIG. 2 depicts an example component tree for a storage object according to certain embodiments.

In addition, FIG. 2 depicts the layout of an example storage object O (reference numeral 200) for a virtual machine VM1 within cluster 104 where VM1 has a storage policy specifying FTT=1. As shown here, storage object O is composed of two RAID-1 replica components C1 (reference numeral 202) and C2 (reference numeral 204) in accordance with row 2 of Table 1 above. These two replica components are persisted on the local storage resources of host systems 106(1) and 106(3) respectively.

As mentioned previously, when a host system in an HCI cluster fails or is brought offline for maintenance, the storage object components stored on the local storage resources of that failed/offline host system (i.e., inaccessible components) are rebuilt on the available host systems of the cluster. The rebuilding of an inaccessible component is typically accomplished via either resynchronization or reconstruction, where "resynchronization" refers to the process of recreating a new copy of the component using RAID-1 replica data and "reconstruction" refers to the process of recreating a new copy of the component using RAID-5 or RAID-6 parity data. With either of these rebuild methods, the inaccessible component is restored to a state in which it can be fully accessed by the still-operational host systems in the cluster, which enables the VM to which the component belongs to re-attain compliance with any fault tolerance requirements (e.g., RAID-1, RAID-5, or RAID-6) specified for its storage objects in its storage policy.

However, existing HCI platforms suffer from two limitations when it comes to the rebuild process: first, these platforms generally cannot rebuild all of the components that are rendered inaccessible by a host failure/maintenance event in parallel; instead, only a certain number of inaccessible components can be rebuilt concurrently, subject to a "maximum in-flight rebuild stream" limit, and any additional components to be rebuilt must wait in a queue until one of the previously started rebuild streams is completed. Second, the order in which inaccessible components are selected/scheduled for rebuilding is random. The combination of these two factors means that the storage object components of less important VMs in the cluster may be randomly scheduled for rebuilding before the storage object components of more important VMs in the cluster, thereby increasing the time to rebuild completion, and thus time to storage policy compliance, for those more important VMs. This is undesirable because the more important VMs can potentially be rendered inoperable or suffer from irrevocable data loss if further failures/outages occur in the cluster during this time period.

To address the foregoing and other similar issues, cluster management server 102 of FIG. 1 is enhanced to include a novel rebuild priority class assignment module 120 (hereinafter referred to as simply "priority class assignor" 120) and each HCI storage agent 110 of FIG. 1 is enhanced to include a novel priority-based rebuild orchestration module 122 (hereinafter referred to as simply "rebuild orchestrator" 122). In various embodiments, priority class assignor 120 can enable an administrator of cluster 104 or some other user (e.g., a human or an automated agent/program) to specify a priority class for each VM 116 provisioned within cluster 104, where the priority class indicates the priority at which the storage object components of that VM should be rebuilt. In one set of embodiments, this priority class may be selected from among a predefined set of text-based values (e.g., "disabled," "lowest," "low," "medium," "high," "highest"). In other embodiments, this priority class may be selected from among a predefined set of numeric values (e.g., 0 through 6) with higher numeric values indicating higher priorities. Upon receiving the specification of a priority class for a given VM 116, priority class assignor 120 can assign the specified priority class to that VM by, e.g., including the priority class in the VM's storage policy. In cases where no priority class has been specified for a VM, priority class assignor 120 may assign a default priority class to the VM, such as "medium."

Then, when a host failure or maintenance event occurs within cluster 104 (thereby triggering a rebuild of the storage object components stored on the local storage resources of that host system), rebuild orchestrators 122(1)-(N) running on host systems 106(1)-(N) can work in concert to orchestrate the rebuild process in a manner that ensures the per-VM priority classes set by priority class assignor 120 are respected and the storage object components of higher priority VMs (i.e., VMs with higher assigned priority classes) are scheduled for rebuilding, on per-VM basis, before the storage object components of lower priority VMs (i.e., VMs with lower assigned priority classes). This advantageously enables the higher priority VMs (which will typically be the business/revenue-critical VMs of the cluster) to re-attain compliance with their respective storage policies as soon as possible after the occurrence of the failure/maintenance event, and thus reduces the time window during which those VMs will be vulnerable to additional failures that can lead to service outages or data loss.

The remaining sections of this disclosure provide additional details regarding the operation of rebuild orchestrators 122(1)-(N) and the orchestration algorithm they may employ in certain embodiments. It should be appreciated that HCI deployment 100 shown in FIG. 1 is illustrative and not intended to limit embodiments of the present disclosure. For example, although FIG. 1 depicts a particular placement of modules 120 and 122 within HCI deployment 100, in alternative embodiments some or all of the functionality attributed to these modules may be implemented on other entities within deployment 100 or cluster 104. Further, the various entities shown in FIG. 1 may include sub-components and/or implement functions that are not specifically described. One of ordinary skill in the art will recognize other variations, modifications, and alternatives.

3. Rebuild Orchestration Workflow

Figure 3:
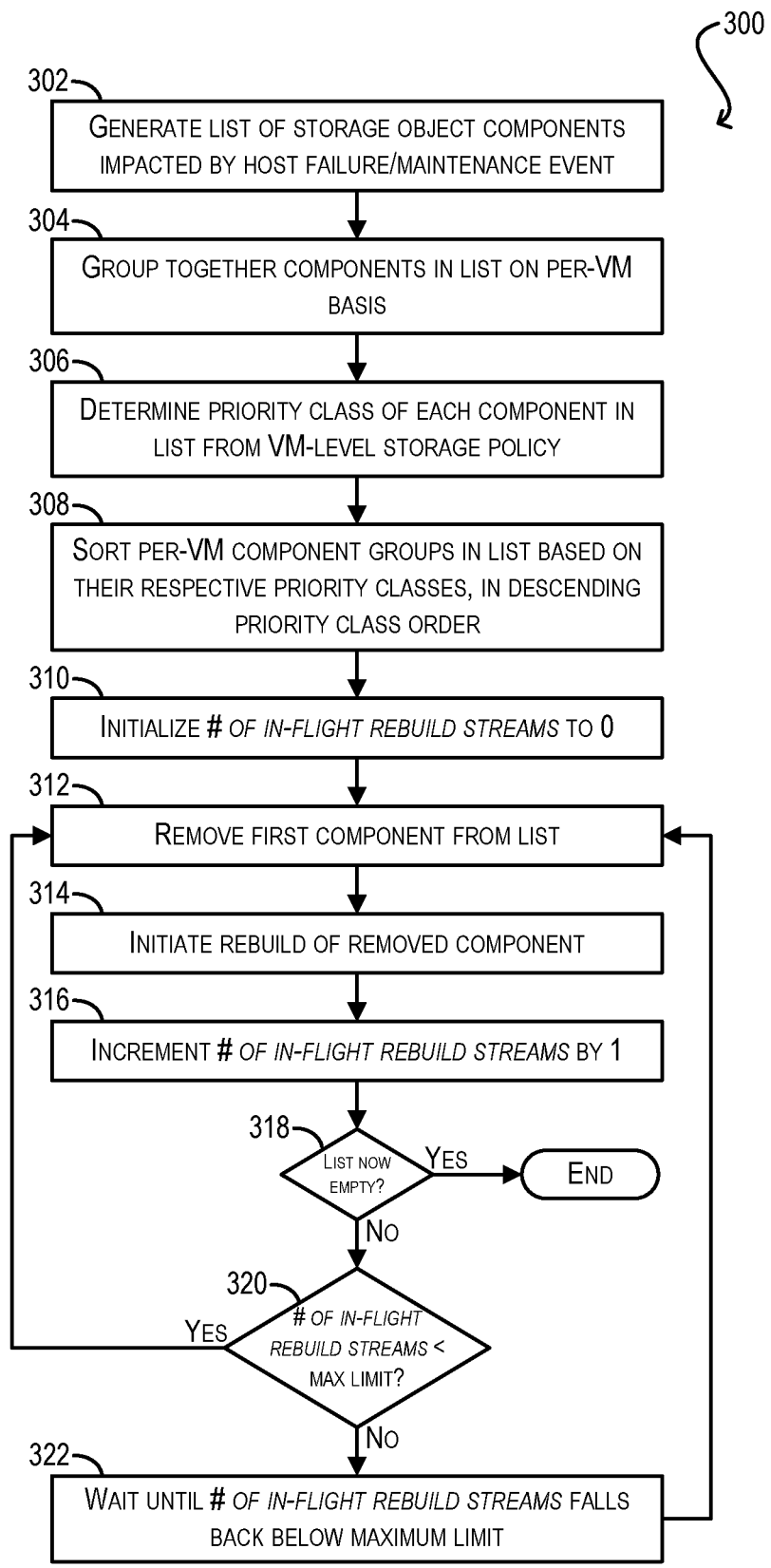
FIG. 3 depicts a rebuild orchestration workflow according to certain embodiments.

FIG. 3 depicts a workflow 300 that may be executed by one or more of rebuild orchestrators 122(1)-(N) of FIG. 1 for orchestrating the rebuild of storage objects components in the case of a host failure or maintenance event in cluster 104 according to certain embodiments. Workflow 300 assumes that each VM 116 of cluster 104 has been assigned a priority class via priority class assignor 120 (either at the time of provisioning the VM or at a later time) and that the assigned priority class is recorded in the VM's associated storage policy. Workflow 300 also assumes that the rebuild orchestrators are configured to interoperate in a distributed manner in order to carry out the steps of the workflow (via, e.g., a master/helper configuration), but the exact nature of this distributed operation is not important for purposes of the present disclosure and thus is not detailed here. In alternative embodiments, the entirety of workflow 300 may be executed by a single rebuild orchestrator 122 running on a single host system 106, or by a single component running on some other system/server within (or communicatively coupled with) HCI deployment 100, such as cluster management server 102.

Starting with block 302, rebuild orchestrator(s) 122 can generate a list of storage object components that have been impacted by the host failure/maintenance event and thus should be rebuilt. This list will typically include all of the components stored on the local storage resources of the failed/offline host system at the time of the event.

At block 304, rebuild orchestrator(s) 122 can group together, within the list, the storage object components on a per-VM basis, such that components belonging to the same VM appear next to each other in the list. For example, assume the list generated at block 302 includes the components listed below, in the order shown:

TABLE 2

| Component | VM |
|---|---|
| VM2_C1 | VM2 |
| VM4_C2 | VM4 |
| VM2_C2 | VM2 |
| VM1_C1 | VM1 |
| VM1_C2 | VM1 |
| VM3_C1 | VM3 |
| VM4_C1 | VM4 |
| VM3_C2 | VM3 |

In this case, the processing of block 304 may group together the components on a per-VM basis as shown below:

TABLE 3

| Component | VM |
|---|---|
| VM2_C1 | VM2 |
| VM2_C2 | VM2 |
| VM4_C2 | VM4 |
| VM4_C1 | VM4 |
| VM1_C1 | VM1 |
| VM1_C2 | VM1 |
| VM3_C1 | VM3 |
| VM3_C2 | VM3 |

At block 306, rebuild orchestrator(s) 122 can determine the priority class of each component in the list by, e.g., accessing the storage policy of the VM to which the component belongs and retrieving the priority class assigned to that VM within its storage policy. Further, at block 308, rebuild orchestrator(s) 122 can sort the per-VM component groups in the list in descending priority class order. For instance, in the example above with VM1-VM4, assume that VM1 and VM2 are assigned a priority class of 5, VM3 is assigned a priority class of 3, and VM4 is assigned a priority class of 2. In this case, the processing at block 308 may reorder the per-VM component groups in the list as shown below:

TABLE 4

| Component | VM |
|---|---|
| VM2_C1 | VM2 |
| VM2_C2 | VM2 |
| VM1_C1 | VM1 |
| VM1_C2 | VM1 |
| VM3_C1 | VM3 |
| VM3_C2 | VM3 |
| VM4_C2 | VM4 |
| VM4_C1 | VM4 |

Then, at blocks 310-314, rebuild orchestrator(s) 122 can initialize a "# of in-flight rebuild streams" variable to 0, remove the first component from the sorted list, and initiate a rebuild of that component. This step of initiating the rebuild can involve, e.g., instructing one or more of HCI storage agents 110(1)-(N) to begin the process of resynchronizing or reconstructing the component on an available host system of cluster 104, as appropriate.

Upon initiating the rebuild of the component at block 314, rebuild orchestrator(s) 122 can increment the # of in-flight rebuild streams variable by 1 (block 316) and can check whether the component list is now empty (block 318). If the answer is yes, that means all of the inaccessible components have begun rebuilding and workflow 300 can end.

However, if the answer at block 318 is no, rebuild orchestrator(s) 122 can further check whether the # of in-flight rebuild streams is less than a maximum limit of in-flight rebuild streams set for cluster 104 (block 320). If so, rebuild orchestrator(s) 122 can return to block 312 in order to remove the next component from the list and initiate the rebuild of that next component.

If the answer at block 320 is no (in other words, # of in-flight rebuild streams has reached the maximum limit of in-flight rebuild streams), rebuild orchestrator(s) 122 can determine that no additional component rebuilds are allowed to be initiated at this time and can wait until the # of in-flight rebuild streams falls below the maximum limit (block 322). This assumes that the # of in-flight rebuild streams variable is automatically decremented once a previously initiated component rebuild stream has been completed, which may be performed by another process/thread of rebuild orchestrator(s) 122 (not shown).

Finally, once the # of in-flight rebuild streams falls below the maximum limit (indicating that a previously initiated component rebuild has completed), rebuild orchestrator(s) 122 can return to block 312 as mentioned above and process the next component in the list.

It should be appreciated that workflow 300 is illustrative and various modifications are possible. For example, in some embodiments the priority class assigned to a given VM may indicate that the storage object components of the VM should not be rebuilt at all (e.g., a priority class of "disabled" or 0). In these embodiments, rebuild orchestrator(s) 122 can remove all such components from the list prior to initiating the component rebuilds starting at block 312.

Further, in some embodiments there may be a need to ensure that the components belonging to the same VM storage object (rather than simply the components belonging to the same VM) are scheduled for rebuilding together. In these embodiments, rebuild orchestrator(s) 122 may take the additional step of grouping together the components of each VM on a per-storage object basis as part of, e.g., block 304.

4. Example Rebuild Scenario

Figure 4:
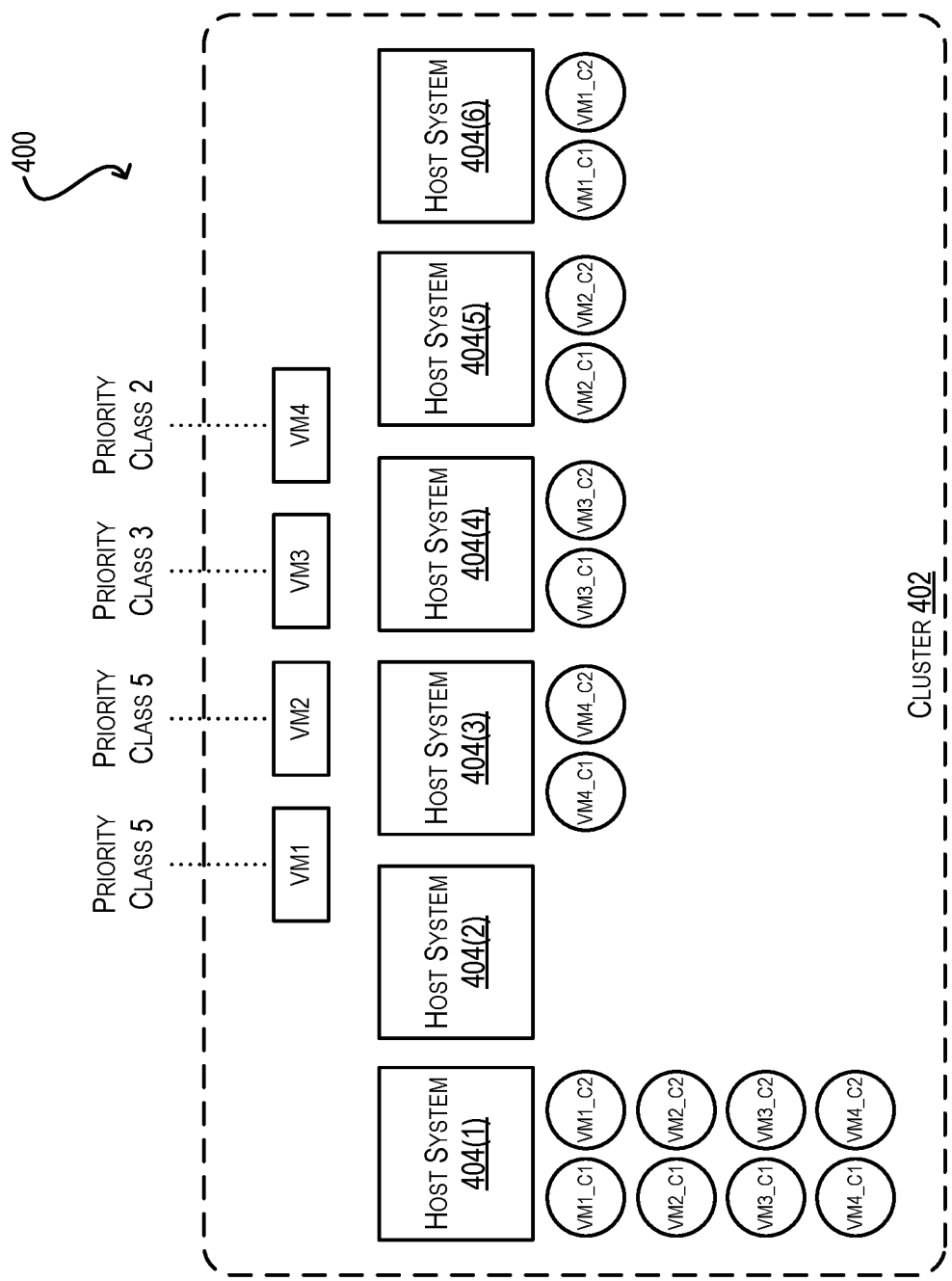
FIGS. 4 and 5 depict an example rebuild scenario per the workflow of FIG. 3 according to certain embodiments.
Figure 5:
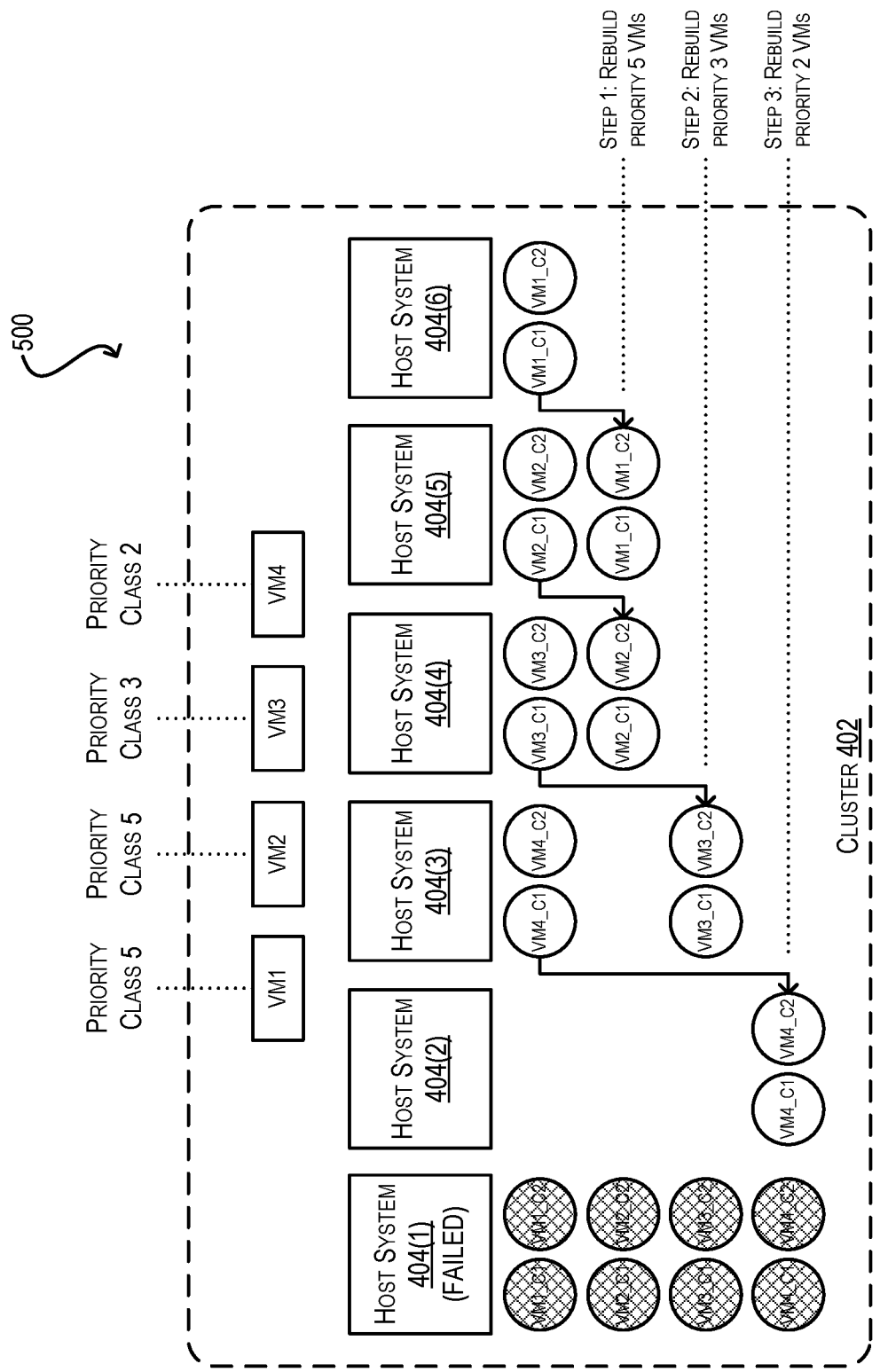

To further clarify the processing presented in workflow 300 of FIG. 3, FIGS. 4 and 5 depict an example rebuild scenario in which workflow 300 is applied. In particular, FIG. 4 depicts a diagram 400 of an HCI cluster 402 comprising six host systems 404(1)-(6) and four VMs (VM1, VM2, VM3, and VM4). These VMs are assumed to identical to the VMs described with respect to Tables 2-4 above and thus VM1 and VM2 are assigned a priority class of 5, VM3 is assigned a priority class of 3, and VM4 is assigned a priority class of 2. Further, each VM1-VM4 has two storage object components that are replicated via RAID-1 across two different host systems—for example, VM1 has components VM1_C1 and VM1_C2 on host systems 404(1) and 404(6) respectively, VM2 has components VM2_C1 and VM2_C2 on host systems 404(1) and 404(5) respectively, VM3 has components VM3_C1 and VM3_C2 on host systems 404(1) and 404(4) respectively, and VM4 has components VM4_C1 and VM4_C2 on host systems 404(1) and 404(3) respectively.

FIG. 5 depicts a diagram 500 of the same cluster 402 from FIG. 4, after host system 404(1) has failed and rebuild orchestration workflow 300 has been employed to orchestrate the rebuild of inaccessible components from the failed host. As shown in FIG. 5, the rebuild of components for VM1 and VM2 (via the resynchronization of VM1_C1/VM1_C2 from host system 404(6) to 404(5) and the resynchronization of VM2_C1/VM2_C2 from host system 404(5) to 404(4) respectively) are executed first because these VMs have the highest priority class of 5. After VM1 and VM2, the rebuild of components for VM3 (via the resynchronization of VM3_C1/VM3_C2 from host system 404(4) to 404(3)) is executed next because VM3 has the second highest priority class of 3. Finally after VM3, the rebuild of components for VM4 (via the resynchronization of VM4_C1/VM4_C2 from host system 404(3) to 404(2)) is executed last because VM4 has the third highest priority class of 2.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for orchestrating and prioritizing a storage object component rebuild process in a hyper-converged infrastructure (HCI) deployment comprising a cluster of host systems, the method comprising:
    identifying, by a computer system, a list of storage object components impacted by a maintenance event or failure of a first host system in the cluster, wherein each host system in the cluster comprises locally-attached storage resources that are aggregated into a virtual storage pool, wherein the virtual storage pool holds storage object components of virtual machines (VMs) running on the cluster, and wherein the storage object components impacted by the maintenance event or failure are stored on the locally-attached storage resources of the first host system;
    determining, by the computer system, a priority class for each storage object component in the list, the determined priority class being based on a VM-level priority class assigned to a VM to which the storage object component belongs; and
    initiating, by the computer system, rebuilds of the storage object components in the list on a per-VM and per-priority class basis, such that:
        the rebuilds of storage object components belonging to the same VM are initiated consecutively; and
        the rebuilds of storage object components with higher priority classes are initiated before the rebuilds of storage object components with lower priority classes.

2. The method of claim 1 wherein the VM-level priority class is specified by a cluster administrator and recorded in a storage policy associated with the VM.

3. The method of claim 1 further comprising:
    for each subset of storage object components in the list belonging to the same VM, grouping together the subset as a per-VM component group within the list; and
    sorting the per-VM component groups in the list based on their respective priority classes.

4. The method of claim 3 wherein initiating the rebuild of each storage object component in the list comprises:
    initializing an in-flight rebuild stream count to zero;
    removing the first storage object component in the sorted list;
    initiating a rebuild of the removed storage object component; and
    incrementing the in-flight rebuild stream count by one.

5. The method of claim 4 further comprising, if the sorted list is not empty after removal of the first storage object component:
    checking whether the in-flight rebuild stream count is less than a maximum number of in-flight rebuild streams supported by the cluster; and
    if the in-flight rebuild stream count is less than the maximum number, repeating the removing, the initiating, and the incrementing.

6. The method of claim 5 further comprising:
    if the in-flight rebuild stream count not less than the maximum number, waiting until one or more previously initiated component rebuilds has completed before repeating the removing, the initiating, and the incrementing.

7. A non-transitory computer readable storage medium having stored thereon program code executable by a computer system, the program code embodying a method for orchestrating and prioritizing a storage object component rebuild process in a hyper-converged infrastructure (HCI) deployment comprising a cluster of host systems, the method comprising:
    identifying a list of storage object components impacted by a maintenance event or failure of a first host system in the cluster, wherein each host system in the cluster comprises locally-attached storage resources that are aggregated into a virtual storage pool, wherein the virtual storage pool holds storage object components of virtual machines (VMs) running on the cluster, and wherein the storage object components impacted by the maintenance event or failure are stored on the locally-attached storage resources of the first host system;
    determining a priority class for each storage object component in the list, the determined priority class being based on a VM-level priority class assigned to a VM to which the storage object component belongs; and
    initiating rebuilds of the storage object components in the list on a per-VM and per-priority class basis, such that:
        the rebuilds of storage object components belonging to the same VM are initiated consecutively; and
        the rebuilds of storage object components with higher priority classes are initiated before the rebuilds of storage object components with lower priority classes.

8. The non-transitory computer readable storage medium of claim 7 wherein the VM-level priority class is specified by a cluster administrator and recorded in a storage policy associated with the VM.

9. The non-transitory computer readable storage medium of claim 7 wherein the method further comprises:
    for each subset of storage object components in the list belonging to the same VM, grouping together the subset as a per-VM component group within the list; and
    sorting the per-VM component groups in the list based on their respective priority classes.

10. The non-transitory computer readable storage medium of claim 9 wherein initiating the rebuild of each storage object component in the list comprises:
    initializing an in-flight rebuild stream count to zero;
    removing the first storage object component in the sorted list;
    initiating a rebuild of the removed storage object component; and
    incrementing the in-flight rebuild stream count by one.

11. The non-transitory computer readable storage medium of claim 10 wherein the method further comprises, if the sorted list is not empty after removal of the first storage object component:

checking whether the in-flight rebuild stream count is less than a maximum number of in-flight rebuild streams supported by the cluster; and if the in-flight rebuild stream count is less than the maximum number, repeating the removing, the initiating, and the incrementing.

12. The non-transitory computer readable storage medium of claim 11 wherein the method further comprises:

if the in-flight rebuild stream count not less than the maximum number, waiting until one or more previously initiated component rebuilds has completed before repeating the removing, the initiating, and the incrementing.

13. A computer system comprising:

a processor; and a non-transitory computer readable medium having stored thereon program code that, when executed, causes the processor to:

identify a list of storage object components impacted by a maintenance event or failure of a first host system in a cluster of a hyper-converged infrastructure (HCI) deployment, wherein each host system in the cluster comprises locally-attached storage resources that are aggregated into a virtual storage pool, wherein the virtual storage pool holds storage object components of virtual machines (VMs) running on the cluster, and wherein the storage object components impacted by the maintenance event or failure are stored on the locally-attached storage resources of the first host system;

determine a priority class for each storage object component in the list, the determined priority class being based on a VM-level priority class assigned to a VM to which the storage object component belongs; and initiate rebuilds of the storage object components in the list on a per-VM and per-priority class basis, such that:

the rebuilds of storage object components belonging to the same VM are initiated consecutively; and the rebuilds of storage object components with higher priority classes are initiated before the rebuilds of storage object components with lower priority classes.

14. The computer system of claim 13 wherein the VM-level priority class is specified by a cluster administrator and recorded in a storage policy associated with the VM.

15. The computer system of claim 13 wherein the program code further causes the processor to:

for each subset of storage object components in the list belonging to the same VM, group together the subset as a per-VM component group within the list; and sort the per-VM component groups in the list based on their respective priority classes.

16. The computer system of claim 15 wherein the program code that causes the processor to initiate the rebuild of each storage object component in the list comprises program code that causes the processor to:

initialize an in-flight rebuild stream count to zero;

remove the first storage object component in the sorted list;

initiate a rebuild of the removed storage object component; and increment the in-flight rebuild stream count by one.

17. The computer system of claim 16 wherein the program code further causes the processor to, if the sorted list is not empty after removal of the first storage object component:

check whether the in-flight rebuild stream count is less than a maximum number of in-flight rebuild streams supported by the cluster; and if the in-flight rebuild stream count is less than the maximum number, repeat the removing, the initiating, and the incrementing.

18. The computer system of claim 17 wherein the program code further causes the processor to:

if the in-flight rebuild stream count not less than the maximum number, wait until one or more previously initiated component rebuilds has completed before repeating the removing, the initiating, and the incrementing.

* * * * *